US012779778B2

(12) United States Patent
Wetzel et al.

(10) Patent No.: US 12,779,778 B2
(45) Date of Patent: Nov. 3, 2026

(54) SYSTEM AND TECHNIQUE FOR FABRICATING A THREE-DIMENSIONAL COMPOSITE STRUCTURE

(71) Applicant: Blue Origin Manufacturing, LLC, Huntsville, AL (US)

(72) Inventors: Eric David Wetzel, Seattle, OR (US); Nathan Darrel Staley, Enumclaw, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 283 days.

(21) Appl. No.: 18/310,464

(22) Filed: May 1, 2023

(65) Prior Publication Data

US 2024/0367371 A1 Nov. 7, 2024

(51) Int. Cl.

| | |
|---|---|
| ***B29C 64/236*** | (2017.01) |
| ***B29C 64/165*** | (2017.01) |
| ***B29C 64/232*** | (2017.01) |
| ***B29C 70/38*** | (2006.01) |
| ***B33Y 10/00*** | (2015.01) |
| ***B33Y 30/00*** | (2015.01) |

(52) U.S. Cl.

CPC .......... *B29C 64/165* (2017.08); *B29C 64/232* (2017.08); *B29C 64/236* (2017.08); *B29C 70/384* (2013.01); *B29C 70/388* (2013.01); *B33Y 10/00* (2014.12); *B33Y 30/00* (2014.12)

(58) Field of Classification Search

CPC ...... B29C 64/106; B29C 64/118; B28B 1/001

See application file for complete search history.

(56) References Cited

U.S. PATENT DOCUMENTS 5,997,681 A * 12/1999 Kinzie .................... B29C 64/40 156/263
6,136,132 A * 10/2000 Kinzie .................. B29C 64/141 264/294
10,174,675 B2 1/2019 Martinez et al.
11,260,582 B2 * 3/2022 TenHouten ........... B29C 64/153
2013/0295338 A1 * 11/2013 Keating .................. E04B 1/167 425/375
2015/0367576 A1 * 12/2015 Page ..................... B29C 64/336 425/132
2016/0001461 A1 * 1/2016 Gardiner ................. E04G 11/00 264/219

(Continued)

FOREIGN PATENT DOCUMENTS

EP 3736108 B1 * 8/2023 ........... B29C 64/118
KR 20190088105 A * 7/2019 ........... B29C 64/227

*Primary Examiner* — Yung-Sheng M Tsui
(74) *Attorney, Agent, or Firm* — Summit Patents, PC

(57) ABSTRACT

Techniques and systems are used to fabricate relatively large composite structures. Fabrication may be performed automatically by a system comprising a relatively large robotic structure configured to hold and to operate various interchangeable end effectors, each having respective functions for fabricating composite structures. The end effector is positioned by the fabricating system to perform various fabrication functions, such as 3D printing, among other things. The fabricating system may include an x-y-z positioning system, a staging area to accommodate a mold, one or more end effectors, an applicator attached to the end effector, and a docking station to store multiple end effectors.

13 Claims, 4 Drawing Sheets

(56) References Cited

U.S. PATENT DOCUMENTS

| | | | | |
|---|---|---|---|---|
| 2016/0046082 | A1* | 2/2016 | Fuerstenberg | B33Y 10/00 425/150 |
| 2016/0075089 | A1* | 3/2016 | Duro Royo | B29C 64/118 425/166 |
| 2016/0151833 | A1* | 6/2016 | Tsao | B23K 9/04 219/136 |
| 2016/0243762 | A1* | 8/2016 | Fleming | G06F 30/00 |
| 2017/0252966 | A1* | 9/2017 | Susnjara | B29C 64/20 |
| 2020/0307174 | A1* | 10/2020 | Woytowitz | B29C 64/393 |
| 2020/0361145 | A1* | 11/2020 | Tsao | B29C 64/241 |
| 2020/0368970 | A1* | 11/2020 | Georgeson | B33Y 10/00 |
| 2021/0039306 | A1* | 2/2021 | Busbee | B29C 64/336 |
| 2021/0252783 | A1* | 8/2021 | Pavanaskar | B29C 64/245 |
| 2021/0370609 | A1* | 12/2021 | Nikshi | B33Y 30/00 |
| 2022/0161486 | A1* | 5/2022 | Miller | B33Y 30/00 |
| 2022/0250309 | A1* | 8/2022 | Tobin | B33Y 40/10 |
| 2023/0234228 | A1* | 7/2023 | Czinger | B25J 9/1682 700/245 |

* cited by examiner

SYSTEM AND TECHNIQUE FOR FABRICATING A THREE-DIMENSIONAL COMPOSITE STRUCTURE

BACKGROUND

Composite structures are used in many fields and for many applications, such as aircraft, spacecraft, automobiles, engineering materials, and sports equipment. For example, aerospace applications generally require high performance such as high strength, high fracture resistance, corrosion resistance, and reduced mass. Composite structures, particularly those in a sandwich configuration, may meet such requirements.

Composite structures may be fabricated layer by layer, such as by a lamination process, with various materials and adhesives, such as reinforced fibers and various polyester or epoxy resins, for example. A sandwich structure generally includes such materials between top and bottom skins having relatively high tensile strength. In addition to the materials themselves, the configuration of the materials may also be important. For example, a fiber material formed as a honeycomb structure may be among several layers in a composite structure that has a strength based on the shape of the honeycomb structure and not necessarily the fiber material itself.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
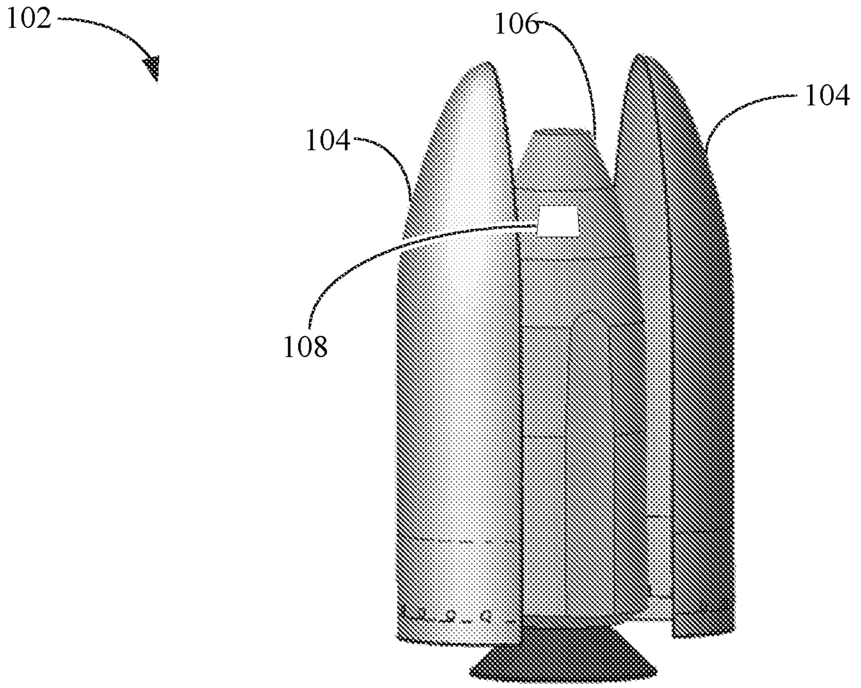
FIG. 1 illustrates portions of a spacecraft that includes fairings and a payload module, according to some embodiments.

This disclosure describes methods and a system for fabricating relatively large composite structures including, in some implementations, composite structures sandwiched between upper and lower skins. In particular, such methods of fabrication may be performed automatically by the system. In some embodiments, the system comprises a relatively large robotic structure configured to hold and to operate various interchangeable end effectors, each having respective functions (via applicators) for fabricating composite structures. Generally, the term "end effector" refers to the functioning end part of a robotic arm. Though this meaning at least partly applies to embodiments described herein, in the following examples "end effector" refers to an interchangeable component of the fabricating system. The end effector is positioned by the fabricating system to perform various fabrication functions, as described below. The fabricating system is hereinafter called an automatic composite fabricator (ACF).

In various embodiments, an ACF may include an x-y-z positioning system, a staging area to accommodate a mold, one or more end effectors, one or more applicators attached to each of the end effectors, and a docking station to store multiple end effectors. The x-y-z positioning system may be relatively large to accommodate the fabrication of relatively large composite structures, such as panels for spacecraft fairings. For example, the x-y-z positioning system may be the size a large industrial-sized room, which may include infrastructure to physically accommodate the x-y-z positioning system. Such a room or facility may include a staging area in which a mold is placed. The mold, on which materials of a composite structure are placed during fabrication, may be stationary and generally located where the x-y-z positioning system can place end effectors. In other words, for a fabrication process, the end effectors may need to reach every part of the surface of the mold. In some implementations, the mold may be generally horizontal. In other implementations, the mold may be generally vertical or held at an angle with respect to gravity.

The ACF may include several end effectors that may be stored at a docking station. During times of such storage, one of the end effectors may instead be attached to the x-y-z positioning system to perform fabrication processes on the mold. When the utility of the attached end effector is complete for a stage of the fabrication process, the attached end effector may be swapped for another end effector, being stored at the docking station, having a functionality different from that of the currently attached end effector.

Each end effector may include various applicators attached thereto. An applicator, for example, may be configured to perform 3D printing on materials already placed on the mold. Another applicator may be configured to apply tape or other material onto the mold or the materials already placed on the mold. Yet another applicator may be configured to apply heat to materials already placed on the mold for a curing process. Still another applicator may be configured to cut materials already placed on the mold for a cutting process. Still another applicator may be a profilometer to measure surface features that may indicate presence of a defect, for example. Functionality of the one or more applicators attached to an end effector at least partially establishes the functionality of the end effector. In some embodiments, put simply, the applicators provide particular functionalities for fabrication and the end effectors provide angular and translational positioning of the applicators.

In some embodiments, 3D printing, which may be used for additive manufacturing, is a process for the construction or building up of structural layers of a composite material. Such structural layers may have a complex or detailed form, such as a honeycomb, matrix, or lattice structure, for example. The structural layers, or other three-dimensional objects, may be based on a computer-aided design (CAD)

model or a digital 3D model. 3D printing may be performed by depositing and solidifying material layer by layer, for example.

The docking station allows for storage and interchangeability of multiple end effectors. For example, the docking station may include multiple portions or slots that respectively store the multiple end effectors. The x-y-z positioning system may be able to reach each slot to drop off or pick up an end effector, as described below. The docking station may be located in various parts of a room that houses the ACF. For example, the docking station may be within a few meters of the mold or may be substantially farther from the mold.

In some embodiments, a method of assembling a composite structure using an ACF may include placing an end effector above a contoured surface of a mold. Based on the shape of the contoured surface, the ACF may simultaneously rotate and move the end effector and attached applicator(s). For example, there may be portions of the contoured surface that are substantially flat so that the end effector may move linearly. There may be other portions of the contoured surface that have relatively complex shapes so that the end effector may rotate the attached applicator(s) while moving linearly. Such rotating comprises a rotational motion about two or more rotational axes and linear motion comprises translational motion along at least one axis. While the end effector rotates and/or moves linearly, the end effector, via an applicator attached thereto, may apply an element that contributes to a buildup of the composite structure on the contoured surface. For example, the element may be a material that forms the composite structure, such as a 3D printable material, tape, fiber, or an adhesive. In some implementations, the element may be a material that is applied to the surface in a fluid, solid, foam, and/or powder form and subsequently hardens to a solid, as in a 3D printing process, such as for forming a honeycomb structure, for example. On the other hand, the element need not be something that is built into the composite structure, such as a cutting process or electromagnetic radiation in the form of heat, laser, ultraviolet, or infrared.

The ACF, and associated methods for fabricating composite structures, may provide a number of benefits and advantages over other fabrication methods. For example, the ACF operates automatically (though in some implementations, an ACF may include manual override portions of a process and may include some manually-performed processes). Such automatic operation may be one or two orders of magnitude faster than manual fabrication. Such automatic operation may also be more accurate and less costly than manual fabrication. In addition, the ACF may fabricate customized composite structures (e.g., panels) having relatively complex shapes. Details of such customization may include placing extra materials around panel openings or varying the strength over different portions of a panel. These customization details may be relatively easy to perform with the ACF. Another benefit of the ACF is that it can fabricate a composite structure in a relatively rapid sequence of processing steps, thereby allowing for greater control of adhesive curing times, for example. Still another benefit of the ACF is that it can fabricate a composite structure with relatively few, if any, joints or transitions between the material sheets, thereby reducing mass and reducing the likelihood of introducing flaws that may be difficult to detect.

FIG. 1 illustrates portions of a spacecraft 102 that includes fairings 104 (e.g., two halves) and a payload module 106, according to some embodiments. Spacecraft 102 is presented as an example of the types of structures, particularly in the aerospace field, that may use panels of composite materials fabricated by an ACF. In some implementations, such panels may act as an inner layer attached to an outer layer of a metal skin, such as aluminum or titanium. These panels may have a primary function of absorbing or dampening sound and vibration, for example.

Payload module 106 includes an opening, such as a window 108. The fairings and the module may comprise panels made of a composite structure such as those fabricated by techniques described here. For example, for a design that is not intended to be exposed to relatively high temperatures, such as during atmospheric reentry, fairings 104 may be assembled from panels of a composite structure, such as a sandwich structure, fabricated by an ACF. Depending on overall size, each half fairing (of which two are illustrated in the figure) may comprise a single panel fabricated in a mold. For larger structures, two or more panels, each having been previously fabricated in a mold, may be assembled together to form a single part, which may be the entire fairing.

Like fairing 104, payload module 106 may also be assembled from two or more panels of composite material fabricated in a mold by an ACF. In some implementations, the composite material may be modified relatively near edges of window 108 (or other openings). For example, the density of epoxy-impregnated fibers may be increased around the perimeter of the window or other opening. The increased density will likely lead to increased strength in this area, though weight will also detrimentally increase. In such cases, however, the trade-off between strength and weight may be important for ensuring sufficient strength around windows and other openings. As described below, an ACF may automatically account for customized design details for the fabrication of a panel of composite materials.

Figure 2:
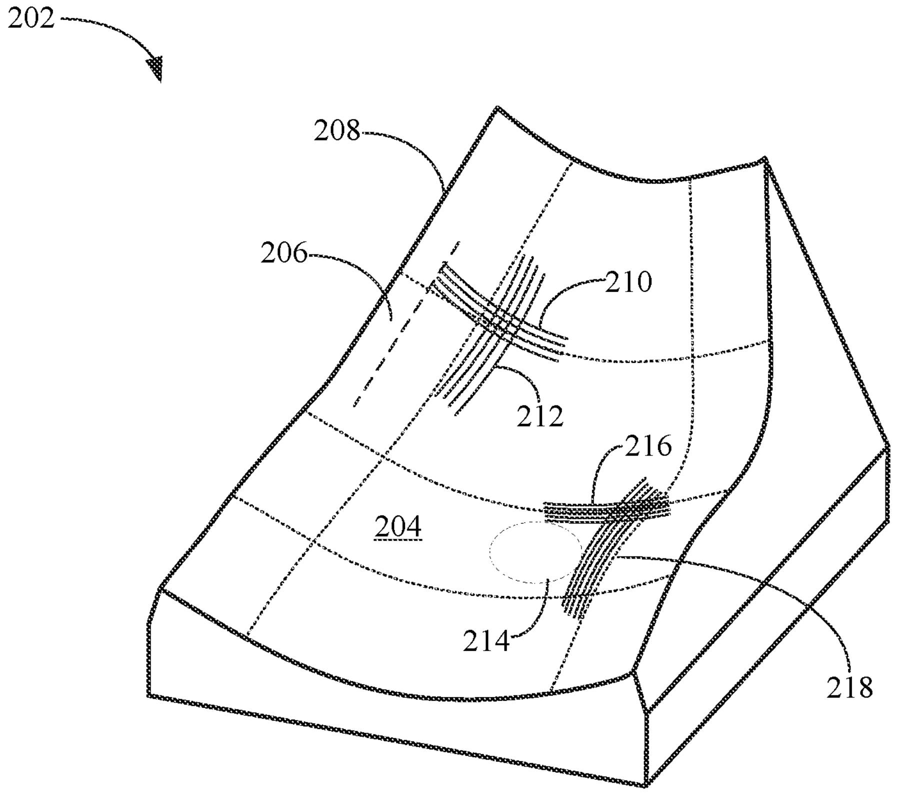
FIG. 2 is a schematic perspective view of a mold for fabricating composite structures, according to some embodiments.

FIG. 2 is a schematic perspective view of a mold 202 for fabricating composite structures, according to some embodiments. The mold, on which a panel of materials of a composite structure are placed during fabrication, may have a surface 204 shaped to match the shape of the finished panel. As mentioned above, depending on the size, a single mold may be used to make a single panel making up a fairing, for example. If a fairing is too large for a single panel, then multiple panels may be constructed to form a fairing (or half-fairing). It may be advantageous to build a fairing, or other part of a final structure, with as few panels as possible, to minimize joints. Generally, an ACF is relatively large so as to allow for fabricating relatively large panels (with relatively large molds).

An ACF may automatically place composite materials onto mold 202 in a layer-by-layer process. The ACF may place these materials over the entire surface of mold 202 or only a portion thereof. For example, the ACF may place materials over the entire surface except for a margin area 206 that is within a predetermined distance of mold edge 208. Materials may be cut so as to not be placed in margin area 206. Such cutting may be performed during placement of the material or at a later process step.

As described below, composite material may comprise fiber-based material placed on mold 202 in a cross-ways fashion. For example, the ACF may place a fiber-based material in a first pass 210 in a first direction and subsequently place the material in a second pass 212 in a second direction. Directions illustrated in the figure are merely examples, and claimed subject matter is not limited in this respect. A composite material may comprise multiple layers of such fiber-based materials. Directions of each layer may alternate, or directions of every two or more layers may alternate. Such design details (e.g., including types of material layers, number of material layers, placement directions, and so on) of a composite structure may vary from panel to panel or may vary over surface 204 of a single panel. For example, an opening 214 may present a vulnerable part of a panel that may require reinforced strength around the perimeter of the opening. Thus, materials in this area may have increased density of mass or placement. In the example, material placed in a first pass 216 in one direction and placed in a second pass 218 in a second direction may have a greater density or thickness compared to the material in other parts (e.g., 210 and 212) of mold 202. These variations may be specified in a fabrication recipe that is followed by an ACF for the panel. In another example, a first material may be placed in first pass 216 in one direction and a second material, different from the first material, may be placed in second pass 218 in a second direction. Such a fabrication process may allow for tuning of coefficient of thermal expansion in a specific direction, or another anisotropic material property (e.g., strength, stiffness, toughness, etc.).

As illustrated, mold 202 may have a relatively complex surface shape. Generally, in addition to flat portions, some portions of surface 204 may be concave and other portions may be convex. As mentioned above, in some implementations, mold 202 may be substantially horizontal or vertical, resting on the floor of a room, for example. In other implementations, the mold may be substantially vertical or held at an angle with respect to gravity. Mold 202 may be made out of a metal or a polymer material, such as fiber-reinforced resins.

Figure 3:
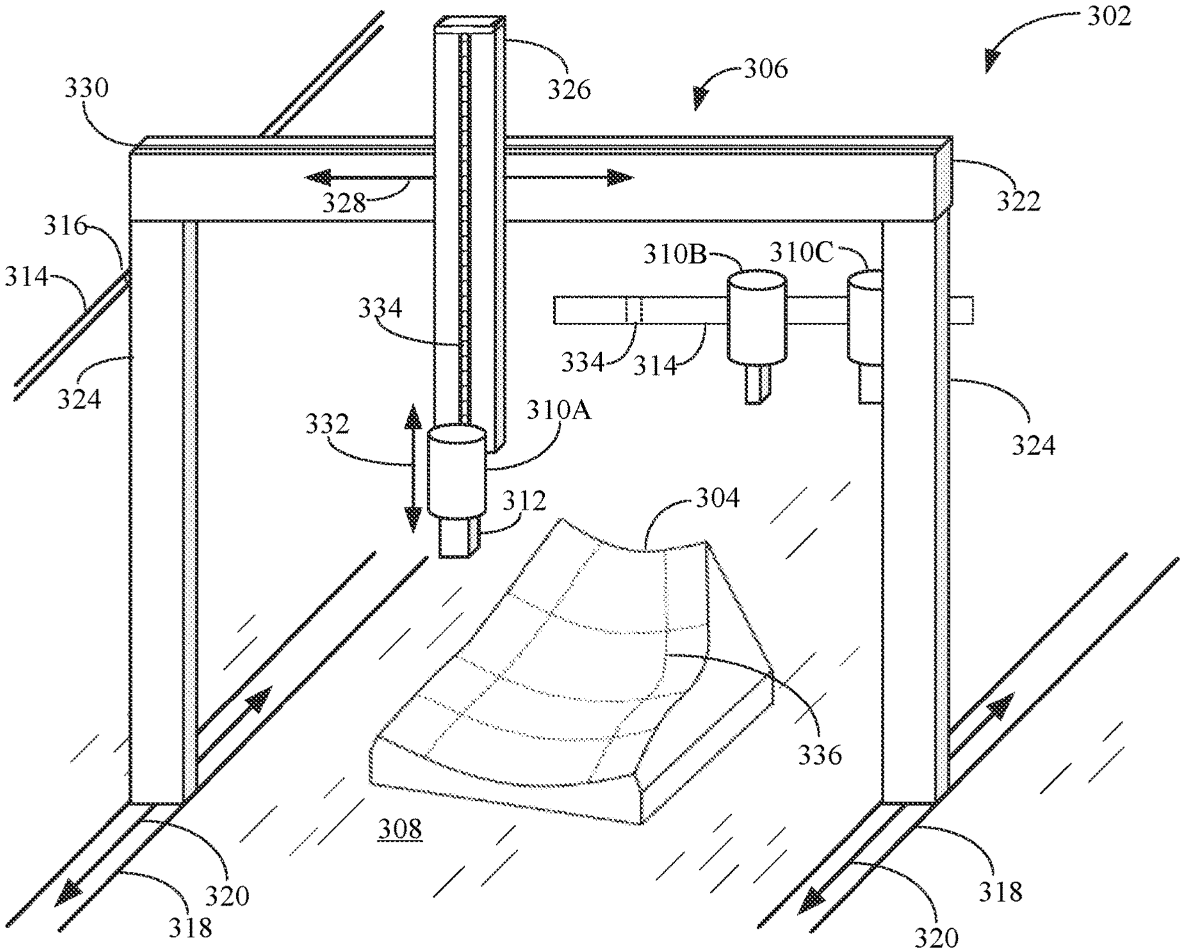
FIG. 3 is a schematic perspective view of an automatic composite fabricator and a mold, according to some embodiments.

FIG. 3 is a schematic perspective view of an ACF 302 and a mold 304, according to some embodiments. ACF 302 may include an x-y-z positioning system 306, a staging area 308 to accommodate the mold, one or more end effectors 310, an applicator 312 attached to the end effector, and a docking station 314 to store multiple end effectors. The x-y-z positioning system, hereinafter called "positioning system," may be relatively large to accommodate the fabrication of relatively large composite structures, such as panels for spacecraft fairings. For example, the positioning system may occupy a substantial portion of a large industrial-sized room, which may include infrastructure to physically accommodate the positioning system, and which may include staging area 308. In various embodiments, the positioning system may be partly attached to a wall(s) or may be free-standing. The positioning system may have multiple vertical support members (e.g., legs). Bottom end portions of such vertical members may include rollers, for example. Though there are many different possible structures on which a positioning system is based, and claimed subject matter is not limited in this respect, examples herein describe the general structure illustrated for positioning system 306.

For example, a wall of a room may include a rail system 314 or other supporting structure. A moveable (e.g., slidable, rollable, etc.) attachment 316 may moveably secure positioning system 306 to the rail. Positioning system 306 may rest on the floor of the room, which may include a rail or track 318. Rollers (not illustrated) may allow for a horizontal rolling motion, indicated by arrows 320.

Positioning system 306 may include a main beam 322, legs 324, and a vertical positioner 326. In the illustrated embodiment, one of the legs 324 is supported by rail system 314 via attachment 316. Legs 324 may be configured to roll or slide on track 318. Main beam 322, supported by legs 324, supports vertical positioner 326, which has a horizontal degree of freedom in a direction indicated by arrows 328. Motion in this direction may be provided by a rail system 330 or similar configuration on main beam 322. Cables/wires (not illustrated) for motion, power, detection, control, and other signals may be flexible to allow for the various motions. Vertical positioner 326 supports end effector 310 and allows for vertical motion of the end effector in a direction indicated by arrows 332. This motion may be provided by a rail system 334 on vertical positioner 326.

Positioning system 306 is configured to place end effector 310 in any location in a space bounded by limits established by the design of the positioning system. Most importantly, positioning system 306 is configured to place end effector 310 on or over any portion of mold 304 placed in staging area 308. Thus, mold 304 may be stationary and located where positioning system 306 can place end effectors 310 on or over the surface of the mold. In the illustrated implementation, the mold is horizontally placed. In other implementations, not illustrated, the mold may be substantially vertical or held at an angle with respect to gravity.

ACF 302 may include several end effectors 310 that may be stored at docking station 314 when not being currently used in a stage of a fabrication process. As illustrated, end effector 310A is attached to vertical positioner 326 and currently being used, while unused end effectors 310B and 310C are being stored at docking station 314 in their respective slots. A docking portion 334 is configured to receive end effector when the end effector is to be stored. For example, when the function of the attached end effector (e.g., 310A) is complete for a stage of a fabrication process, the attached end effector may be swapped for another end effector (e.g., 310B or 310C) stored at docking station 314.

Each end effector 310 may include various applicators 312 attached thereto. As mentioned above, an applicator may be configured to apply tape or other material onto the mold (or onto materials already placed on the mold). Another applicator may be configured to apply heat for a curing process, to cut materials for a cutting process, or to measure surface features, just to name a few examples. End effector 310 may be configured to place applicator 312 in any angular position, with degrees of rotational freedom including pitch, roll, and yaw. Simultaneously, while placing the applicator into such an angular position, positioning system 306 may provide x-y-z positioning. Accordingly, compound motion in six degrees of freedom may be provided to applicator 312. This motion allows for the applicator to reach any portion of the surface of mold 304 and allows for the applicator to be positioned at any angle relative to the surface of the mold. For example, ACF 302 may move applicator 312 along, and just above, a contour line 336 on the surface of mold 304 while simultaneously rotating the applicator to be perpendicular to the surface at all portions of the contour line.

As described above, docking station 314 allows for storage and interchangeability of multiple end effectors. For example, the docking station may include multiple portions or slots (e.g., 334) that respectively store the multiple end effectors. Positioning system 306 is configured to reach each slot to drop off or pick up an end effector. The docking station may be located in various parts of the room that houses the ACF. For example, the docking station may be within a few meters of mold 304 or may be substantially farther from the mold. In the illustrated example, docking station 314 may be located at or near a distal end of the positioning system's reach, such as on a wall or vertical structure (not illustrated).

As explained above, a method of assembling a composite structure using ACF 302 may include placing end effector 310, and thus applicator 312, above a contoured surface of mold 304. Based on the shape of the contoured surface, the ACF may simultaneously rotate and move the applicator. For example, there may be portions of the contoured surface that are substantially flat so that the applicator, attached to the end effector, may move linearly with no angular motion (e.g., no rotation). There may be other portions of the contoured surface that have relatively complex shapes so that the applicator may rotate while moving linearly. Such rotating comprises a rotational motion about two or more rotational axes and linear motion comprises translational motion along at least one axis. While the applicator rotates and/or moves linearly, the applicator may apply an element that contributes to a buildup of the composite structure on the contoured surface. For example, the element may be a material that forms the composite structure, such as tape, fiber, or an adhesive. On the other hand, the element need not be something that is built into the composite structure, such as a cutting process or electromagnetic radiation in the form of heat, laser, ultraviolet, or infrared.

Figure 4:
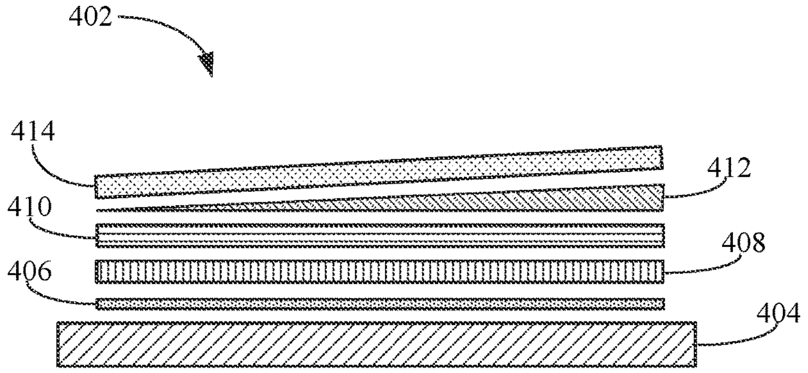
FIG. 4 is a cross section of various materials and adhesives of a composite structure, according to some embodiments.

FIG. 4 is a cross section of various materials and adhesives of a portion of a composite structure 402 formed on the surface of a mold 404, according to some embodiments. Such materials may include fiber-reinforced composite materials made of reinforced fibers such as glass fibers, carbon fibers, and aramid fibers. Prepreg is a class of materials of reinforced fibers impregnated with a matrix resin in advance of being applied in a fabrication process. Other materials may include cured products of thermosetting resins such as unsaturated polyester resins, vinyl ester resins, epoxy resins, phenol resins, cyanate ester resins, and bismaleimide resins, just to name a few examples. Such materials may be placed on or in composite structure 402 via a 3D printing process. In various implementations, materials may be selected to have relatively favorable mechanical properties such as strength and elastic modulus, heat resistance, and corrosion resistance while being lightweight. Composite materials made of such materials may be formed into panels that are used in aircraft, spacecraft, automobiles, and so on.

As an illustrated example, composite structure 402 may include a tape layer 406 applied to mold 404. An applicator (e.g., 312) may be used to automatically apply tape layer 406, which may be a peel ply, for example. A first fiber-reinforced composite sheet material 408 may be automatically applied onto tape layer 406 in a first direction by ACF 302. A second fiber-reinforced composite sheet material 410 may be automatically applied onto first fiber-reinforced composite sheet material 408 in a second direction by ACF 302. Both the first fiber-reinforced composite sheet material 408 and the second fiber-reinforced composite sheet material 410 may be applied by an applicator (e.g., 312A) configured to function in this manner. Subsequently, in some implementations, a 3D printable material 412 (e.g., PLA, ABS, PETG, PVA, etc.) may be applied with a constant or variable thickness, depending, for example, on strength or stiffness requirements for composite structure 402. For example, an end effector may apply the 3D printable material with a density, thickness, or contour that varies with location on composite structure 402, the varying being based on localized strength requirements of the composite structure. Herein, "localized" means the area substantially at the location where the material is applied. In other implementations, 3D printable material 412 may be applied in a fashion that forms a honeycomb structure (not illustrated). For example, such a structure may be applied so as to conform to an underlaying layer of composite structure 402. In other embodiments, an IR-curable resin (also depicted as 412) may be applied (via 3D printing or other application process), in fluid form, to impregnate fiber-reinforced composite sheet materials 408 and 410. A different applicator (e.g., 312B) may be used to dispense the resin, for example. Next, ACF 302 may apply IR radiation to IR-curable resin 412. In some implementations, the same applicator that applied the resin may be used to apply the IR radiation. In this case, the applicator may be equipped with different tools, one being a material dispenser and another being an IR radiator, for example. In other implementations, an applicator that applied the resin may be different from an applicator that applies the IR radiation. After a curing time has elapsed, if necessary, another fiber-reinforced composite sheet materials 414 may be applied onto the materials thus far laminated onto mold 404. Subsequent layers of materials may be added to the portion of the composite structure 402, which is a specific example. Many variations in materials and order of placement are possible and claimed subject matter is not limited in this respect.

Figure 5:
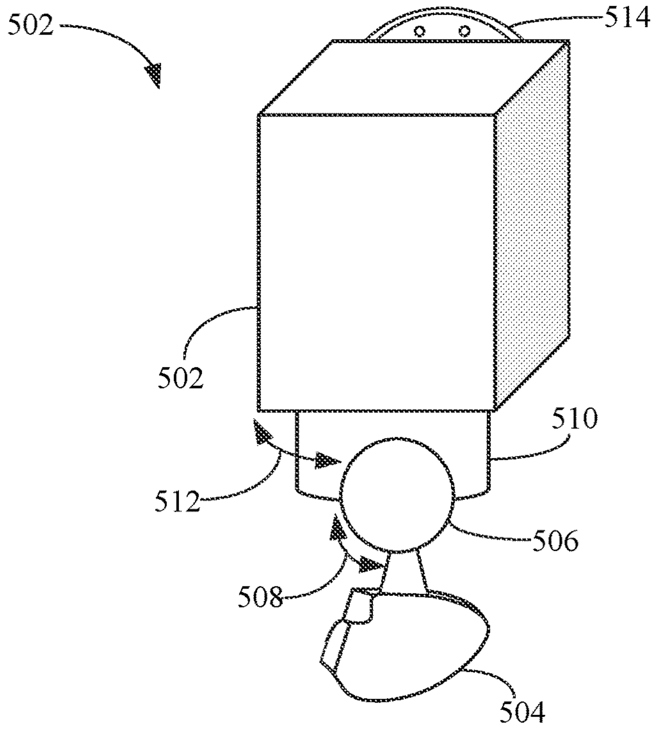
FIG. 5 is a schematic perspective view of an end effector for placing material onto a mold, according to some embodiments.

FIG. 5 is a schematic perspective view of an end effector 502 for placing material onto a mold, such as mold 202, according to some embodiments. End effector 502 includes an applicator 504 that, in this example, is a fiber-reinforced material dispenser configured to continuously, on demand, place the material onto the surface of a mold or on material already placed on the mold. Applicator 504 is attached to a first rotatable portion 506 of end effector 502. First rotatable portion 506, which can rotate in a direction indicated by arrows 508, is attached to a second rotatable portion 510, which can rotate in a direction indicated by arrows 512. The axes of rotation of first and second rotatable portions 506 and 510 are perpendicular to each other. First and second rotatable portions 506 and 510 are attached to a main portion of end effector 502 that is in turn attachable to vertical positioner 326, for example. Several types of attachment 514 are possible. In some implementations, end effector 502 may be attachable and supported by vertical positioner 326 is such a way that the end effector may be automatically detached so as to be replaced by another end effector, which may be stored at docking station 314, for example.

End effector 502 may provide applicator 504 with rotational degrees of motion while positioning system 306 may provide translational (e.g., x-y-z) degrees of motion. With the combination of motions provided by the end effector and the positioning system, the applicator may be placed in any spatial orientation over any portion of the mold.

As explained above, each end effector may include various applicators. An applicator, such as 504 for example, may be configured to apply tape or other material onto a mold or materials already placed on the mold. Another applicator may be configured to apply heat to materials already placed on the mold for a curing process. In an implementation, an end effector may include more than one applicator. For example, one applicator may be configured to cut materials already placed on the mold and the other applicator may be a profilometer to measure surface features that may indicate presence of a defect.

Figure 6:
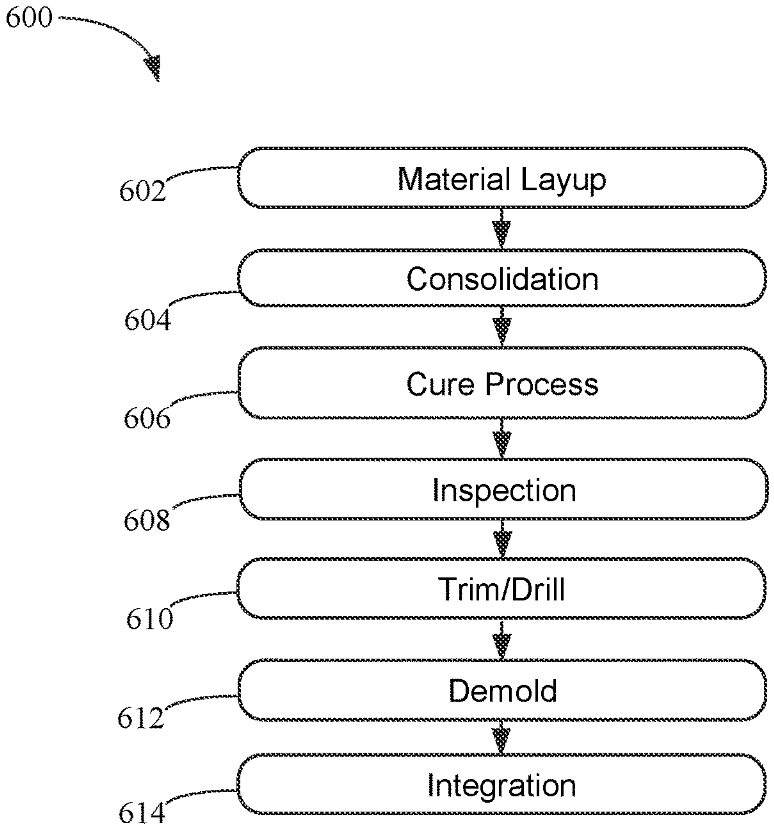
FIG. 6 is a flow diagram of a process for fabricating a composite structure into a panel, according to some embodiments.

FIG. 6 is a flow diagram of a process 600 for fabricating a composite structure, such as a panel, according to some embodiments. Only a portion of process 600 is performed by an ACF. Remaining portions may be performed manually, for example. In a particular implementation, steps 602 and 606 may be performed by the ACF. In detail, at step 602, the ACF may automatically, following a predetermined fabrication prescription, perform material layup. This process may involve a layer-by-layer buildup of composite materials placed on a mold by an applicator. As explained above, the applicator may be attached to an end effector that provides the applicator with rotational degrees of freedom. The end effector may be attached to a positioning system (e.g., 306) that may provide translational motion.

Step 604 may involve a process called vacuum bagging, which is a technique for creating mechanical pressure on one or more laminates during a curing cycle. Vacuum bagging may be manually performed. Step 606 may involve any of a number of types of curing processes and may be performed by the ACF. For example, the ACF may perform a process of curing by a photo-chemical reaction by irradiating composite materials and/or adhesives with IR or UV "light," which may be emitted by an applicator of the ACF. A curing process may also involve heat (a form of IR radiation) that may also be applied by an applicator of the ACF. Still another type of curing process may involve simply waiting for a cure time to elapse. The ACF may perform this type of curing by working on one portion of a material layup on a mold while avoiding activity on another portion that is being cured. Steps 602, 604, and 606 are generally not performed singly and linearly but instead any of these steps may be performed out of this order and repeated any number of times.

Inspection, in step 608 may be performed manually and/or automatically. For example, automatic inspection may be performed by the ACF using a profilometer on an end effector. Data measured by the profilometer may be placed in memory to be analyzed at a later time or the data may be used in real-time to set alarms or notifications, for example, if any proximity measurement is out of bounds set by predetermined design parameters. In a particular example, a problematic air bubble between material layers may be detected this way.

Step 610 may be performed manually and/or automatically. For example, trimming or drilling may be performed by the ACF using a cutting or drilling tool on an end effector. Demolding in step 612 may be manually performed with the use of a small crane to remove the fabricated composite structure from the mold, for example. Integration, of step 614, may involve combining the just-fabricated composite material panel with previously fabricated panels to form an overall structure.

Figure 7:
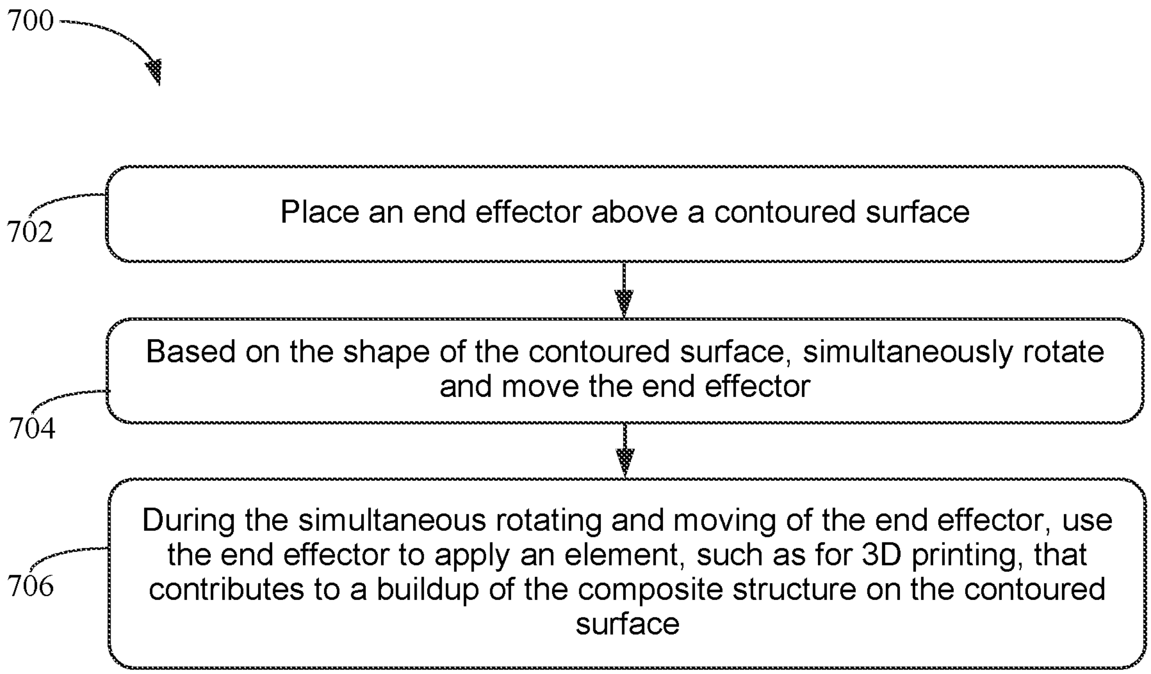
FIG. 7 is a flow diagram of a process for fabricating a composite structure using an automatic composite fabricator, according to some embodiments.

FIG. 7 is a flow diagram of a process 700 for fabricating a composite structure using an ACF, such as ACF 302, according to some embodiments. For example, an electronic controller or a computer processing system may follow computer-executable instructions to perform process 700 using ACF 302.

At 702, the ACF may maneuver a positioning system, such as 306, to place an end effector above a contoured surface of a mold. An applicator having a particular functionality may be attached to the end effector. At 704, the ACF may, based on the shape of the contoured surface, simultaneously rotate and move the end effector to place an applicator attached to the end effector at a distance and angle, with respect to the contoured surface, that allows the applicator to perform its respective fabrication function. The rotating process comprises rotational motion about two or more rotational axes (e.g., pitch, roll, yaw) and the moving process comprises translational motion along at least one axis (e.g., x, y, z).

At 706, the automatic system may, during the simultaneous rotating and moving of the end effector, use the end effector, or an applicator attached thereon, to apply an element that contributes to a buildup of the composite structure on the contoured surface. The element may be a material, such as tape, fiber, or an adhesive, or may be a process of 3D printing, wherein a 3D printable material is applied by the end effector onto the contoured surface of the composite structure. Another process may be inspecting (e.g., by a profilometer), cutting, or applying heat, a laser, ultraviolet radiation, or infrared radiation, just to name a few examples. For example, applying heat or laser, ultraviolet, or infrared radiation may allow for (faster) curing of a plastic material extruded in a 3D printing process by the end effector.

The ACF may automatically vary a pattern of applying the element based, at least in part, on a strength or density prescription for the composite structure that is being fabricated on the mold. For example, if the element is a plastic material extruded in a 3D printing process, then the plastic material may be placed on the composite structure with a varying density, thickness, or contour. In some implementations, the composite structure may be a fairing that requires extra strength or stiffness in various portions, such as around openings, edges, or connecting sections, just to name a few examples.

Figure 8:
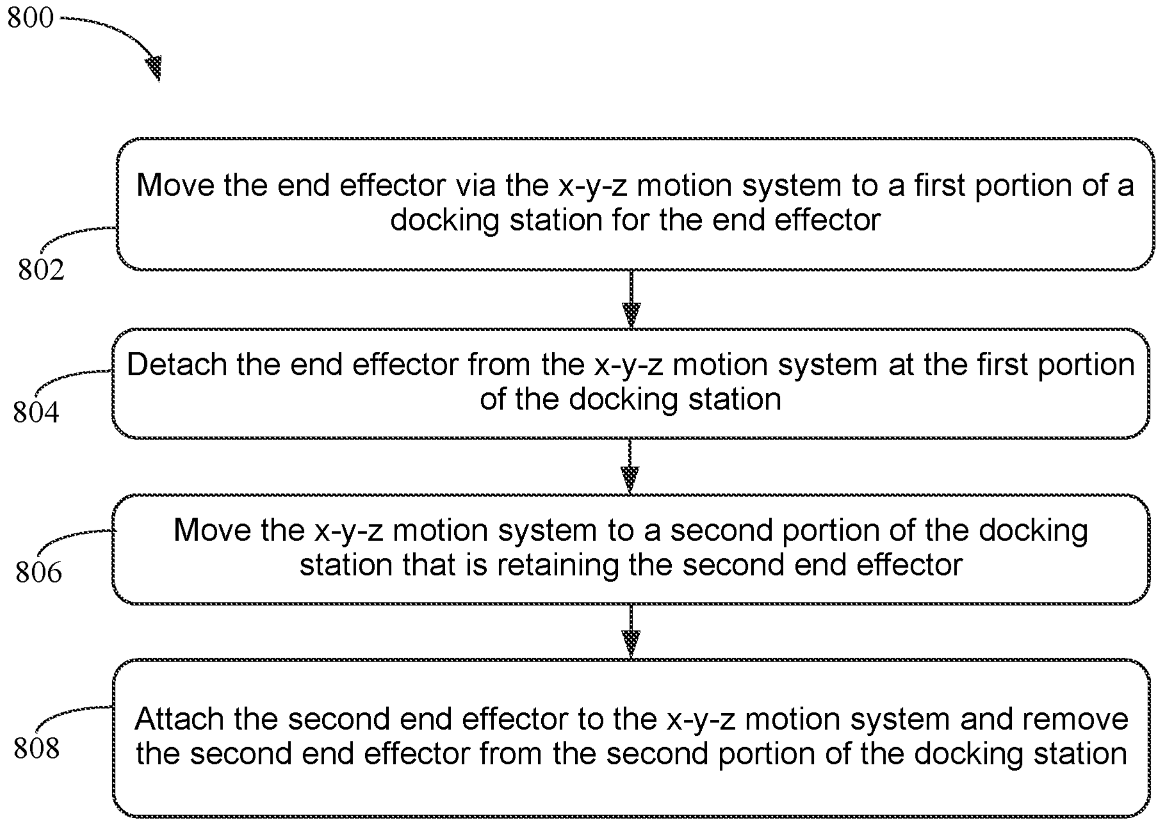
FIG. 8 is a flow diagram of a process for an automatic composite fabricator to swap an end effector for another end effector, according to some embodiments.

FIG. 8 is a flow diagram of a process 800 for an ACF to swap an end effector for another end effector, according to some embodiments. As for process 700, an electronic controller or a computer processing system may follow computer-executable instructions to perform process 800 using ACF 302. At 802, the ACF may move the end effector via an x-y-z motion system, such as positioning system 306, to a first portion of a docking station that is designated for the end effector. At 804, the ACF may detach the end effector from the x-y-z motion system at the first portion of the docking station. At 806, the ACF may move the x-y-z motion system to a second portion of the docking station that is storing a second end effector. At 808, the ACF may attach the second end effector to the x-y-z motion system and remove the second end effector from the second portion of the docking station.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. A method for building a composite structure on a contoured surface of a mold, the method comprising:

positioning, by an x-y-z positioning system of an automatic composite fabricator, an end effector carrying an applicator relative to the contoured surface of the mold, the contoured surface of the mold being shaped to match a shape of a finished panel formed from the composite structure;

applying, by the automatic composite fabricator, at least one fiber-reinforced composite sheet material onto the contoured surface of the mold;

applying, with the applicator, a plastic material extruded in a three-dimensional printing process onto the at least one fiber-reinforced composite sheet material on the contoured surface of the mold layer by layer, such that successive layers conform to the curvature of the contoured surface of the mold;

operating, by a controller of the automatic composite fabricator, the x-y-z positioning system and the end effector to coordinate translational motion of the end effector along at least one of an x-axis, a y-axis, or a z-axis with rotational motion of the end effector about two or more rotational axes during application of the plastic material, wherein the coordinated translational and rotational motion moves the applicator along a contour line of the contoured surface while rotating the applicator to maintain the applicator substantially perpendicular to the contoured surface along the contour line; and removing the composite structure from the mold after the plastic material is applied.

2. The method of claim 1, wherein the rotational motion of the end effector includes rotation about at least a pitch axis and a yaw axis.

3. The method of claim 1, wherein applying the plastic material comprises varying at least one of a density, a thickness, or a contour of the plastic material as a function of location on the composite structure based on localized strength or stiffness requirements.

4. The method of claim 1, wherein the plastic material forms a predefined internal geometry, including a honeycomb structure.

5. The method of claim 1, wherein a deposition path is generated using a digital model of the contoured surface.

6. The method of claim 1, further comprising inspecting at least a portion of the composite structure using a profilometer carried by the end effector or by a second end effector, the profilometer measuring a surface feature indicative of a defect.

7. The method of claim 1, further comprising pausing application of the plastic material and replacing the end effector with a second end effector having a different functionality.

8. The method of claim 7, wherein the second end effector is configured to apply tape, fiber, or an adhesive material to the composite structure.

9. The method of claim 1, further comprising applying a tape layer onto the contoured surface of the mold before applying the at least one fiber-reinforced composite sheet material, wherein the at least one fiber-reinforced composite sheet material is applied onto the tape layer.

10. The method of claim 1, wherein the mold is oriented in at least one of a generally horizontal orientation, a generally vertical orientation, or an orientation angled with respect to gravity during application of the plastic material.

11. The method of claim 1, wherein the applicator dispenses the plastic material on demand during application of the plastic material.

12. The method of claim 1, wherein the three-dimensional printing process comprises depositing and solidifying the plastic material layer by layer.

13. The method of claim 1, further comprising applying a tape layer onto the contoured surface of the mold before the at least one fiber-reinforced composite sheet material is applied, wherein the at least one fiber-reinforced composite sheet material is applied onto the tape layer.

* * * * *